(12) United States Patent
Tien

(10) Patent No.: US 7,480,428 B2
(45) Date of Patent: Jan. 20, 2009

(54) MECHANISM TO SPECTRALLY COMBINE AND DIVIDE OPTICAL I/O

(75) Inventor: An-Chun Tien, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 51 days.

(21) Appl. No.: 11/322,859

(22) Filed: Dec. 30, 2005

(65) Prior Publication Data
US 2007/0154142 A1   Jul. 5, 2007

(51) Int. Cl.
*G02B 6/34* (2006.01)
(52) U.S. Cl. .................. 385/37; 385/31; 385/131
(58) Field of Classification Search ............... 385/31, 385/37
See application file for complete search history.

(56) References Cited

U.S. PATENT DOCUMENTS

| | | | |
|---|---|---|---|
| 5,015,835 A * | 5/1991 | Ohuchida et al. ....... 250/201.5 |
| 5,051,790 A | 9/1991 | Hammer | |
| 5,107,359 A * | 4/1992 | Ohuchida .................... 398/79 |
| 5,278,817 A * | 1/1994 | Maeda et al. .......... 369/112.12 |
| 5,469,518 A | 11/1995 | Song et al. | |
| 2004/0120049 A1 * | 6/2004 | Bartlett et al. .............. 359/627 |

OTHER PUBLICATIONS

PCT Search Report dated Dec. 28, 2007.

* cited by examiner

*Primary Examiner*—Frank G Font
*Assistant Examiner*—Eric Wong
(74) *Attorney, Agent, or Firm*—Blakely, Sokoloff, Taylor & Zafman LLP

(57) ABSTRACT

An optical assembly is disclosed. The optical assembly includes two or more photo devices to transmit and receive optical signals and a pair of parallel gratings to combine optical signals received from the two or more photo devices prior to transmitting the optical signals to an optical fiber and to separate combined optical signals received from the optical fiber into two or more optical signals to be received at the two or more photo devices.

19 Claims, 4 Drawing Sheets

MECHANISM TO SPECTRALLY COMBINE AND DIVIDE OPTICAL I/O

FIELD OF THE INVENTION

The present invention relates to fiber optic communications; more particularly, the present invention relates to spectrally combining and dividing fiber optic signals.

BACKGROUND

More frequently, optical input/output (I/O) is being used in computer systems to transmit data between system components. Optical I/O is able to attain higher system bandwidth with lower electromagnetic interference than conventional I/O methods. In order to implement optical I/O, radiant energy is coupled to a fiber optic waveguide from an optoelectronic integrated circuit (IC).

Typically, a fiber optic communication link includes a fiber optic transmitting device such as a laser, a fiber optic cable span, and a light receiving element such as a detector. Further, there is an increasing objective in current optical I/O systems to transmit and receive multiple wavelengths via a single optic fiber, thus enabling multiple I/O data streams to be simultaneously transmitted/received.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

According to one embodiment, a mechanism to spectrally combine and divide optical I/O is disclosed. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
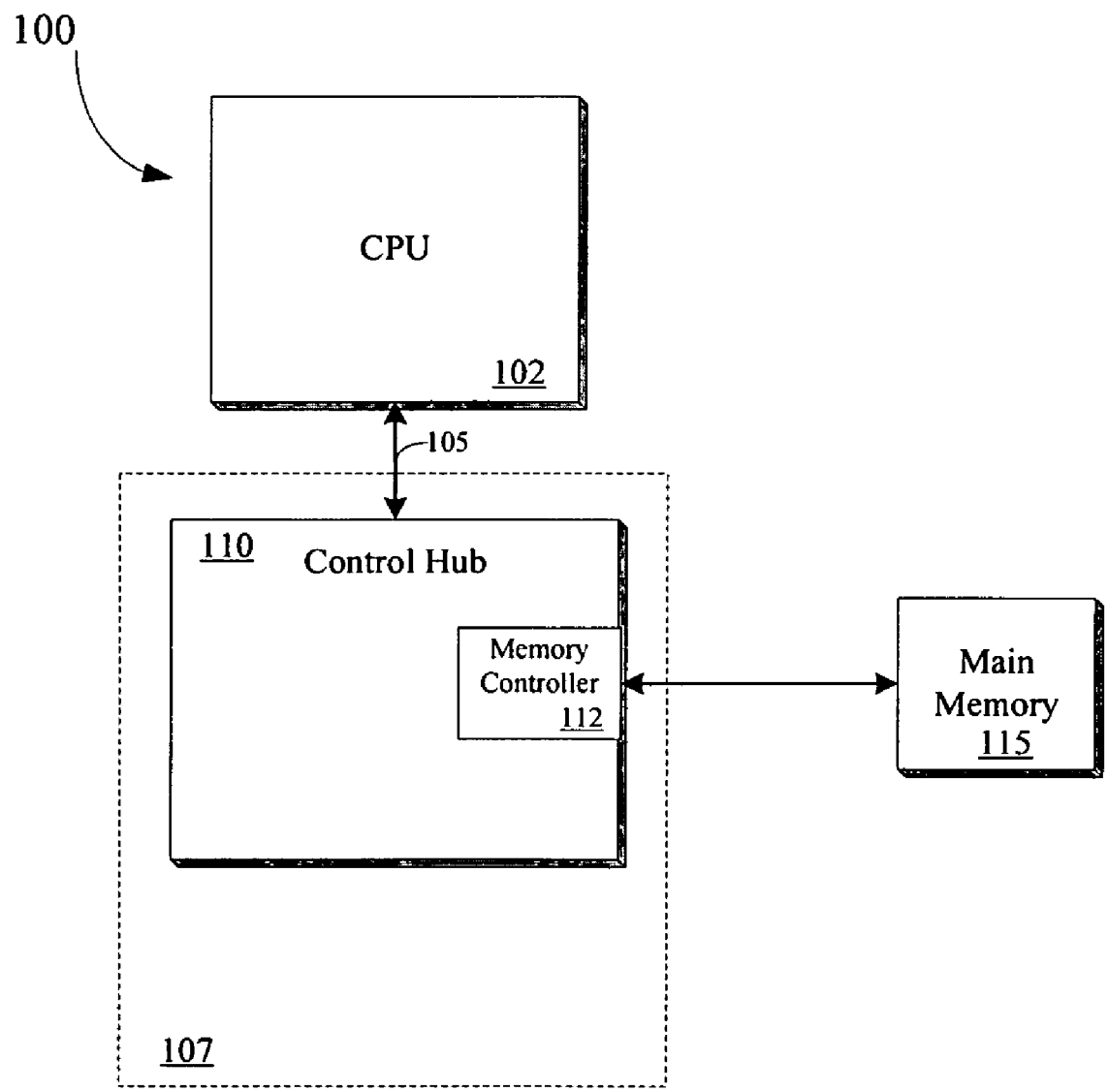
FIG. 1 illustrates one embodiment of a computer system.

FIG. 1 is a block diagram of one embodiment of a computer system 100. Computer system 100 includes a central processing unit (CPU) 102 coupled to an interface 105. In one embodiment, CPU 102 is a processor in the Pentium® family of processors including the Pentium® IV processors available from Intel Corporation of Santa Clara, Calif. Alternatively, other CPUs may be used. In a further embodiment, CPU 102 may include multiple processor cores.

According to one embodiment, interface 105 is a front side bus (FSB) that communicates with a control hub 110 component of a chipset 107. Control hub 110 includes a memory controller 112 that is coupled to a main system memory 115. Main system memory 115 stores data and sequences of instructions and code represented by data signals that may be executed by CPU 102 or any other device included in system 100.

In one embodiment, main system memory 115 includes dynamic random access memory (DRAM); however, main system memory 115 may be implemented using other memory types. According to one embodiment, control hub 110 also provides an interface to input/output (I/O) devices within computer system 100.

Figure 2:
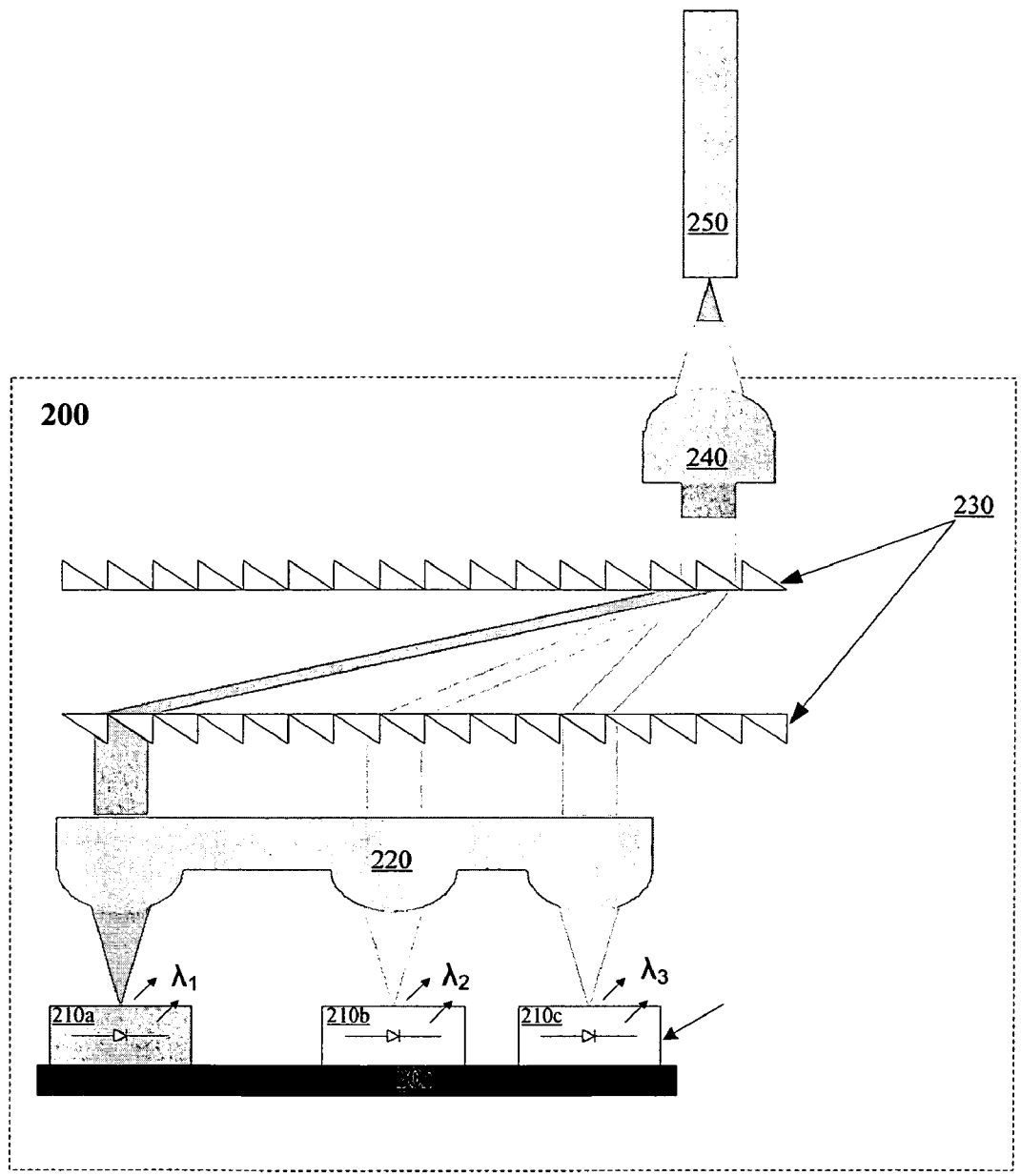
FIG. 2 illustrates one embodiment of an optical assembly.

FIG. 2 illustrates one embodiment of an optical assembly 200. In such an embodiment, optical assembly 200 is implemented to couple optical I/O between components within computer system 100. For instance, optical assembly 200 may couple optical I/O between CPU 102 and control hub 110, and/or control hub 110 and main memory 115. In other embodiments, optical assembly 200 may couple a component within computer system 100 to another computer system.

Referring to FIG. 2, optical assembly 200 includes optical transmitters/receivers (transceivers) 210 (e.g., 210a, 210b and 210c) mounted on a printed circuit board (PCB) 205, lenses 220, grating 230 lens 240 and fiber 250. Transceiver 210 includes a receiver component and a transmitter component used to transmit/receive optical data.

The receiver component includes active components, such as a detector photo device, that are implemented to receive optical data from one or more optical fibers. The detector photo devices convert a detected optical input signal into an electrical signal that is forwarded to circuitry on PCB 205. The transmitter component receives electrical signals and converts the signals to optical output signals that are transmitted from via a laser photo device. According to one embodiment, each photo device transmits/receives optical I/O at a different wavelength. For example, photo device 210a operates at a first wavelength $\lambda_1$, photo device 210b operates at a second wavelength $\lambda_2$, and photo device 210c operates at a third wavelength $\lambda_3$.

Lenses 220 are collimation (or focus) lenses that each capture source beams from a laser in a particular photo device. The lenses capture as much of the source beam as possible and transform the beams into separate low divergence parallel beams (or collimated output). Lens 240 performs the same function for source beams received from optical fiber 250.

Each of lenses 220 and lens 240 feed collimated output to diffraction grating 230. Grating 230 separates light of different wavelengths with high resolution. Grating 230 includes a multitude of parallel, closely spaced slits to separate the light.

The relationship between incident and exit beams of a diffraction grating can be described by Bragg's law $$m\frac{\lambda}{d} = n_1 \sin\theta_1 - n_2 \sin\theta_2,$$

where m is the order of the exit beam and m is an integer, $\lambda$ is the wavelength of the beam, d is the grating period, n is the index of refraction, $\theta$ is the angle of the beam measured from the normal of the interface, subscripts 1 and 2 denote incident and exit, respectively.

When a beam enters a pair of parallel diffraction gratings with the same grating period, the exit beam of the system is parallel to the incident beam as long as the index of refraction is the same for both the incidence side and the exit side. Here only the same order (same m) of the beam is considered. Thus, a grating can be fabricated for optimal efficiency at a given order.

In one embodiment, the above-described property is implemented at grating 230 to split a beam into several paths. Each spectral component in the incident beam follows a different exit path. All of the beam paths are separate in space but parallel to the incident beam. This allows simple implementation for photo devices within transceivers 210a-210c.

In a further embodiment, the reverse is true for gratings. Thus, a pair of parallel diffraction gratings with the same grating period may be used to combine beams with different wavelengths. According to one embodiment, grating 230 separates and combines light. In such an embodiment, grating 230 combines the collimated output received from transceivers 210a, 210b and 210c via lenses 220, and separates the collimated output received from lens 240.

Figure 3:
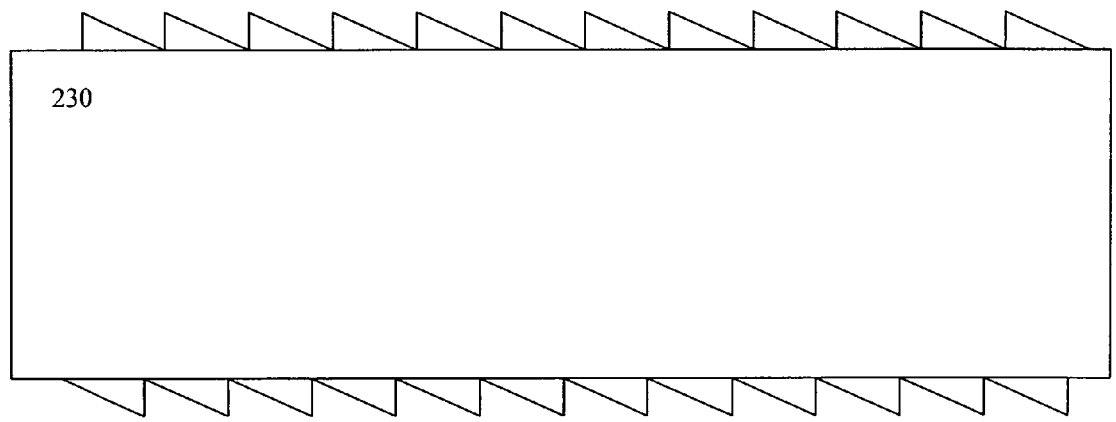
FIG. 3 illustrates one embodiment of gratings.
Figure 4:
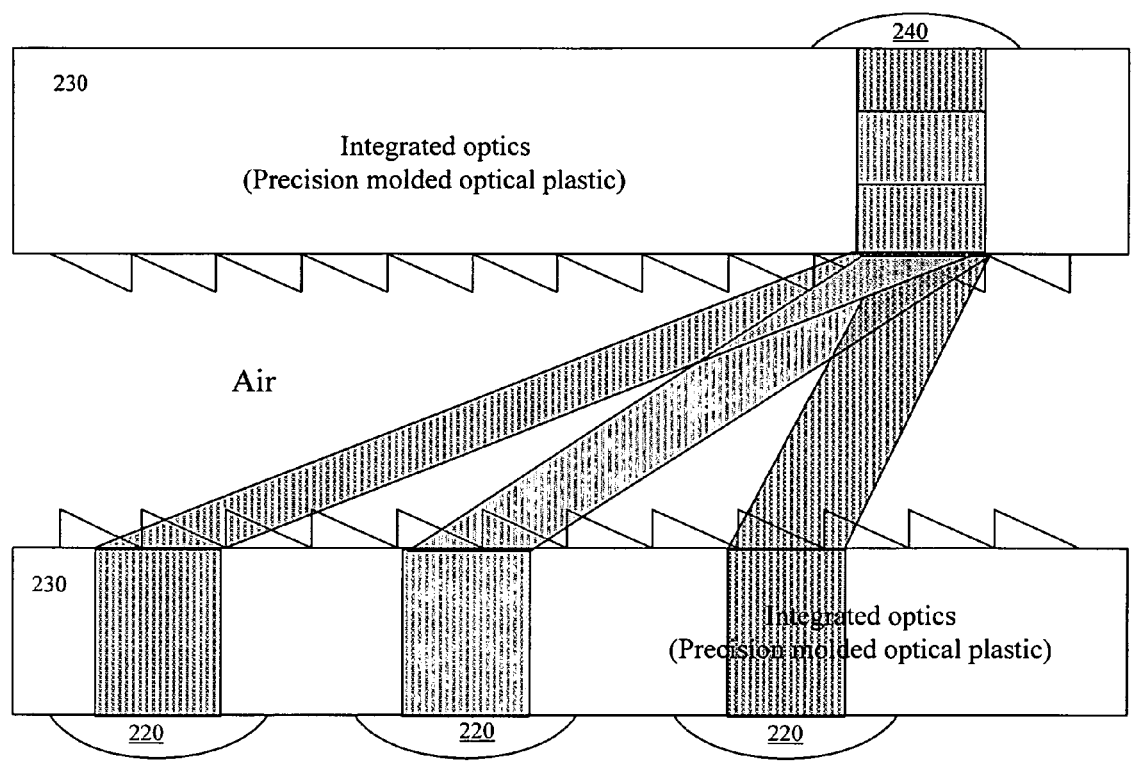
FIG. 4 illustrates another embodiment of gratings.

In a further embodiment, grating 230 is fabricated on both sides of a glass (or plastic) plate. This type of fabrication is enabled due to the index of refraction of the medium between the gratings not affecting the angle of the exit beam(s). FIG. 3 illustrates one embodiment of a gratings fabricated on both sides of a plate. In other embodiments, gratings 230 may be separated parallel surfaces with an air gap in between. FIG. 4 illustrates one embodiment of separated gratings. In still other embodiments, grating 230 may be integrated with lenses 220, lens 240, or both lenses 220 and lens 240.

Note that, although described with respect to optical I/O, optical assembly 200 may also be employed in a CD/DVD read head, where there are two or more lasers with different colors. In other embodiments, optical assembly 200 may also be used for WDM (wavelength division multiplexing) to multiplex or to de-multiplex optical signals consisted of different wavelengths.

Since an exit beam is parallel to the incident beam, the use of the collimating/focusing lenses improves the alignment sensitivity to fluctuation of each wavelength, for example, wavelength variation from device to device, wavelength shift due to temperature change. Further, because the exit beam(s) and the incident beam(s) are parallel to each other, angular deviation of the beams is virtually eliminated by the parallel grating configuration. The residual translational deviation can be corrected by collimating/focusing lenses. Wide tolerances in alignment can be beneficial to optical links composed of polymer optical fiber, because the core size of polymer optical fiber is in general much larger than common glass optical fiber.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. An optical assembly comprising:
a first photo device to transmit and receive optical signals at a first wavelength;
a second photo device to transmit and receive optical signals at a second wavelength; and
a grating having a first side including a first set of parallel gratings and a second side including a second set of parallel gratings with a same grating period as the first set of parallel grating to enable an incident beam received at either side of the grating to have a parallel exit beam, the first side to combine optical signals received from the first and second photo devices prior to transmitting the optical signals to an optical fiber and the second side to separate combined optical signals having the first and second wavelengths received from the optical fiber into optical signals to be received at the first and second photo devices.

2. The optical assembly of claim 1 further comprising a first lens to receive optical signals from the first photo device and a second lens to receive optical signals from the second photo device.

3. The optical assembly of claim 2 further comprising a third lens to receive the combined optical signals from the optical fiber.

4. The optical assembly of claim 3 wherein the first, second and third lenses are collimating lenses.

5. The optical assembly of claim 2 wherein the grating is physically combined the first and second lenses to form a single component.

6. The optical assembly of claim 3 wherein the grating is physically combined the third lens to form a single component.

7. The optical assembly of claim 3 wherein the grating is physically combined with the first, second and third lenses to form a single component.

8. The optical assembly of claim 1 wherein the grating is fabricated on both sides of a plate to prevent an index of refraction of the plate from affecting the angle of one or more exit beams.

9. A method comprising:
receiving first optical signals from a first photo device at a first side of a grating including a first set of parallel;
receiving second optical signals from a second photo device at the first side of the grating;
combining the first and second optical signals at the grating prior to transmitting the combined optical signals to an optical fiber;
receiving combined optical signals at a second side of the grating from the optical fiber, the second side including a second set of parallel gratings with a same grating period as the first set of parallel grating to enable an incident beam received at either side of the grating to have a parallel exit beam, the first side; and
separating the combined optical signals into the first optical signals to be received at the first photo device and the second optical signals to be received at the second photo device.

10. The method of claim 9 further comprising:
receiving the first set of optical signals at a first lens from a first photo device prior to the optical signals being received at the grating; and
focusing the first set of optical signals.

11. The method of claim 10 further comprising:
receiving the second set of optical signals at a second lens from a second photo device; and
focusing the second set of optical signals.

12. The method of claim 11 further comprising:
receiving the combined optical signals at a third lens from the optical fiber; and
focusing the combined optical signals.

13. A system comprising:
a printed circuit board (PCB);
a first photo device mounted on the PCB to transmit and receive first optical signals;
a second photo device mounted on the PCB to transmit and receive second optical signals;
an optical fiber to transfer optical signals; and a grating having a first side including a first set of parallel gratings and a second side including a second set of parallel gratings with a same grating period as the first set of parallel grating to enable an incident beam received at either side of the granting to have a parallel exit beam, the first side to combine optical signals received from the first and second photo devices prior to transmitting the optical signals to an optical fiber and the second side to separate combined optical signals having the first and second wavelengths received from the optical fiber into optical signals to be received at the first and second photo devices.

14. The system of claim 13 wherein the first optical signals have a first wavelength and the second optical signals have a second wavelength.

15. The system of claim 14 further comprising a first lens to receive optical signals from the first photo device and a second lens to receive optical signals from the second photo device.

16. The system of claim 15 further comprising a third lens to receive the combined optical signals from the optical fiber.

17. The system of claim 16 wherein the first, second and third lenses are collimating lenses.

18. The system of claim 15 wherein the grating is physically combined the first and second lenses to from a single component.

19. The system of claim 16 wherein the grating is physically combined the third lens to form a single component.

* * * * *